April 19, 1960

L. R. PAYNE 2,932,934

CROP ENGAGING TINE ASSEMBLY

Filed July 18, 1958

INVENTOR.
LEONARD RIDGES PAYNE
BY
*Carlson, Pitzner, Hubbard & Wolfe*
ATTORNEYS.

United States Patent Office 2,932,934
Patented Apr. 19, 1960

2,932,934

CROP ENGAGING TINE ASSEMBLY

Leonard R. Payne, Birmingham, England, assignor to Massey-Ferguson (Great Britain) Limited, Coventry, England, a British company Application July 18, 1958, Serial No. 749,411

Claims priority, application Great Britain July 27, 1957

7 Claims. (Cl. 56—400)

The invention relates to crop-engaging tines for haymaking or other crop harvesting machinery, and especially to a tine unit for use in rakes of the side-delivery type and other implements employing rotary components for raking or gathering cut crop material.

Such tines usually have integrally formed spring coils to give them resilience, and if they are deflected an appreciable amount in any direction they obtain a permanent set and it is then necessary to replace them. The tines can also vibrate appreciably and since, in use, they are given a motion in which they pass close to stripper bars on their down stroke, serious bending and damage to the tines or even to the stripper bars may be occasioned as a result of the tines fouling the latter on the down stroke.

It is an object of the invention to provide an improved tine assembly in which these disadvantages are obviated or mitigated.

Another object is to provide a tine assembly in which the tines are supported in a novel manner which permits them to flex in any direction transverse to their longitudinal axes and in which the tines are preloaded or yieldably urged into normal working positions by forces applied so that the flexing characteristics are approximately the same in all directions.

A more specific object is to provide a tine assembly in which one end of the tine extends through a hole in a tine-holding member or support bar to engage a resilient device, and a circular flange on the tine cooperates with an abutment surface on the tine-holding member. The use of the circular abutment and the resilient force being applied approximately along the axis of the tine insures that the characteristics for the flexing of the tine in all directions are approximately the same.

In order that the nature of the invention may be clearly understood, an embodiment will now be described, by way of example, with reference to the accompanying drawings, in which Figure 1 is a plan view of a conventional side-delivery rake.

While a preferred embodiment of the invention and one modification have been shown and will be described herein, it is not intended to limit the invention to particulars of the disclosure. The intention is to cover all modifications and adaptations falling within the spirit and scope of the invention as more broadly or generally characterized in the appended claims.

Figure 1:
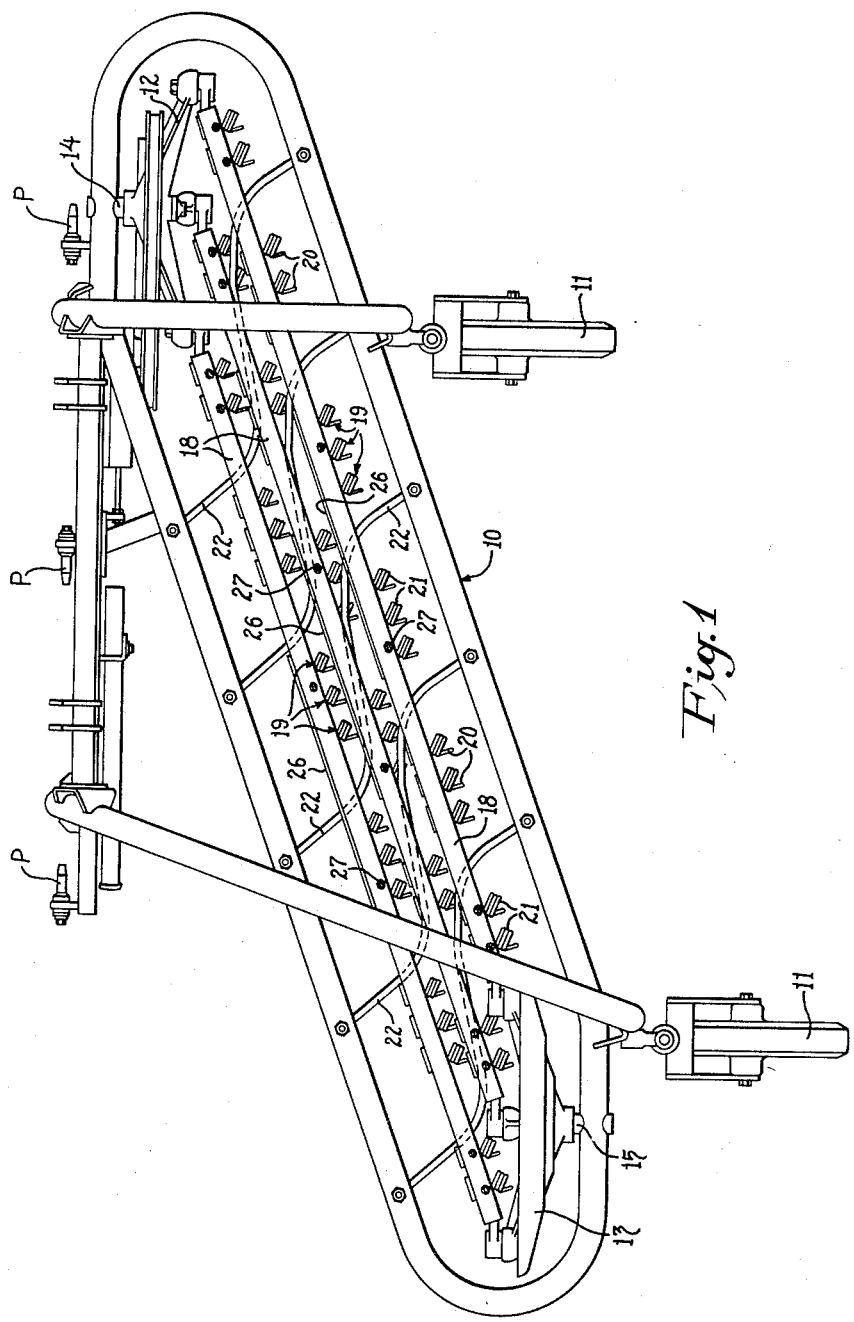

Referring to Fig. 1 of the drawings, this shows a conventional side-delivery rake having a main frame 10 supported at the rear on a pair of caster wheels 11 and adapted to be supported at the front on a tractor three-point linkage by the usual coupling pins P.

A pair of discs 12, 13 spaced laterally and slightly fore and aft are rotatably mounted on shafts 14, 15, which are rigidly attached to the frame 10, and the front disc 12 is driven in any suitable manner from the tractor power take-off. Extending between and freely mounted at equally spaced intervals on the periphery of the discs 12, 13 is a series of tine bars 18, each carrying a series of tines 19 in spaced groups. Each tine 19 consists of a downwardly extending part 20 and an integrally formed spring part 21 which gives the tine 19 resiliency, and allows it to ride over or avoid obstacles on the ground without damage.

In operation, the rake is pulled over the ground to bridge two swathes, and the disc 12 is rotated so that the tines on the lowermost tine bar 18 move in a direction which is generally from right to left as seen in Fig. 1, thus sweeping the hay to the left. As the disc rotates further, the tine bar 18 is lifted and the hay is swept off the tines 19 by the stripper bars 22 which extend across the frame 10. The tines 19 on the next bar then engage the hay and move it further to the left, and this operation continues until the hay reaches the left hand side of the machine and it is left in a windrow.

A tine of the type shown in Fig. 1 is subject to vibration or "dither" and, as it leaves the ground, the tine is vibrating due to the contact of its point with the ground, and, especially if the tine has just encountered an obstruction, this vibration may be quite large. Each tine 19, in its upward travel, is lifted completely over the stripper bars 22 and on its downward travel again passes close to the bars 22, and if the tine 19 is vibrating it may catch on the wrong side of a stripper bar 22, thus damaging the tine and possibly the stripper bar.

In the conventional side delivery rake, the central tines 19 on each tine bar 18 are not attached directly to the bar 18 but are attached to an intermediate bar 26 which is secured to the tine bar 18 by bolts 27, and to convert the machine to a swathe turner it is only necessary to remove the intermediate bars 26.

Figure 2:
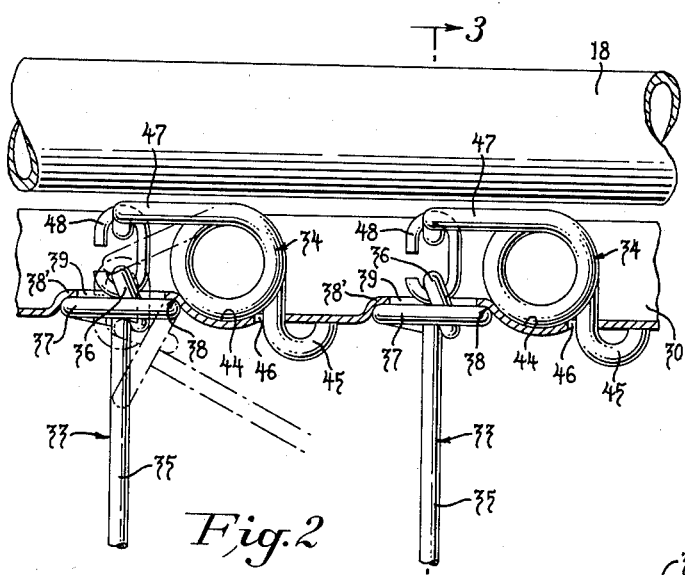
Fig. 2 is a fragmentary view with parts shown in section of a tine assembly embodying the features of the invention.
Figure 3:
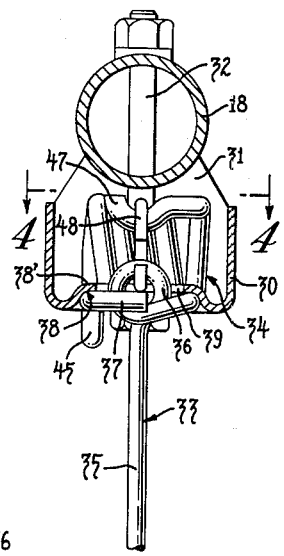
Fig. 3 is a sectional view taken along the line 3—3 of Fig. 2.
Figure 4:
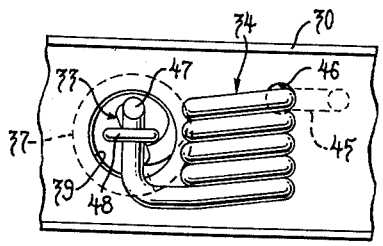
Fig. 4 is a fragmentary plan view of the assembly shown in Fig. 2 with certain parts removed.
Figure 5:
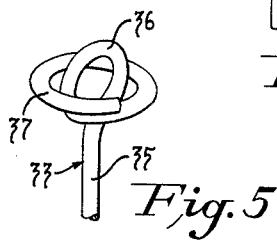
Fig. 5 is a perspective view of the upper portion of a tine.

Referring now to Figs. 2, 3 and 4 which show a tine assembly constructed in accordance with the invention, a series of secondary tine bars 30 is mounted on each tine bar 18 which, in this embodiment, is formed from a hollow tube. The secondary bars 30 are generally channel-shaped in cross section and have integral upwardly extending flanges 31 at opposite ends (Fig. 3) which seat on the tine bar 18 and are held in position by bolts 32.

Each secondary tine bar 30 carries a series of tine assemblies of which each comprises a tine 33 and spring 34. Each tine 33 consists of a single length of rod, of which one end 35 is straight so as to form the crop engaging portion, and the other end is bent to form a loop 36 and a circular abutment part 37. The centers of both the loop 36 and the abutment 37 are on the axis of the straight part 35 of the tine 33. The abutment 37 rests in an outwardly facing annular groove 38 formed by an inwardly pressed boss 38' in the secondary bar 30 and the loop 36 passes through a hole 39 in the bar centered in the groove 38.

The spring 34 as shown is a coil spring and is located in a transverse groove 44 formed in the secondary bar 30. One end 45 of the spring 34 passes through a hole 46 in the bar 30 and is hooked over to bear against the underside of the bar 30. The other end 47 of the spring 34 extends generally horizontally and is connected by a link 48 with the loop 36 of the tine 33.

In the normal position, the spring 34 holds the tine 33 up so that its abutment part 37 nests in the groove 38 against the bottom thereof, and there is a substantial preload on the tine which is sufficient to prevent deflection of the tip under normal working conditions. Should, however, an obstruction be encountered, the tine 33 will deflect as shown in broken lines in Fig. 2, and on clearing of the obstruction it will immediately return to its normal position and by virtue of the preload any vibration will be considerably damped. The tines 33 can deflect in any direction since they may pivot about any point on the periphery of the groove 38, and, furthermore, since the groove 38 and abutment 37 are circular and the spring force is applied to the center of the circle the force needed to produce a given deflection in any direction is the same. With this arrangement, the tine 33 is also capable of being deflected a considerable amount without being damaged and it is in fact possible for the tine 33 to pass over the wrong side of a stripper bar 22 and not be damaged.

The machine may be converted from a side-delivery rake to a swathe turner simply by removing central sections of the secondary tine bars 30.

Figure 7:
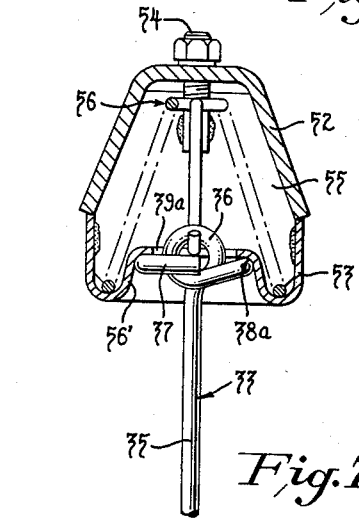
Fig. 7 is a sectional view on the line 7—7 of Fig. 6.
Figure 6:
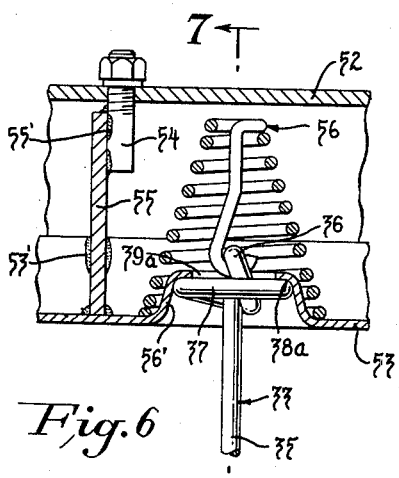
Fig. 6 is a view similar to Fig. 2 showing a modified form of assembly.

Figs. 6 and 7 show a modification of the tine assembly for application to a rake or the like in which the tine bar 52 is of inverted channel shape in cross section. The secondary tine bars 53 are generally similar to those previously described. The latter are attached to the bar 52 by studs 54 welded to a plate 55 as indicated at 55' which in turn is welded to the secondary bar 53 as indicated at 53'. The tine 33 is the same as that described with reference to Fig. 2 apart from the fact that its coil spring is replaced by a conical spring 56 which is concentric with the axis of the tine 33. The lower end of the spring 56 seats round the annular boss 56' which defines the groove 38a in which the tine abutment 37 nests. The operation of the modified embodiment of the tine is the same as that described above with reference to the embodiment shown in Figs. 2 to 4. It will be understood, of course, that the marginal edge portion of the boss around the hole 39a may be turned down or outwardly if desired to insure that the abutment 37 on the tine 33 does not slip inwardly when the tine is deflected.

While the invention has been described only with reference to a side-delivery rake, it will be apparent it may also be applied to any crop handling machinery which utilizes crop engaging tines, for instance, the pick-up reel of a baler or other harvesting machine.

I claim as my invention:

1. A tine assembly for crop handling implements comprising, in combination, an elongated bar having a hole and an annular groove disposed around the hole, a tine including an elongated crop engaging portion having means adjacent one end defining an annular abutment concentric with the longitudinal axis of the crop engaging portion, and spring means interposed between said one end of the tine and said bar operative to urge said abutment against the bottom of said groove, said spring means yielding to permit the tine to pivot on said abutment in any direction upon application of a predetermined laterally directed force to the crop engaging portion of the tine.

2. A tine assembly for crop handling implements comprising, in combination, an elongated bar having a hole and an annular groove disposed around the hole, a tine including an elongated crop engaging portion having means adjacent one end defining an annular abutment concentric with the longitudinal axis of the crop engaging portion, said abutment seating in said groove with the crop engaging portion of the tine extending laterally of the bar when assembled therewith, and spring means disposed at the side of said bar opposite the crop engaging portion of the tines and having a connection with said one end of the tine operative to apply tension to the tine to maintain said abutment in engagement with the bottom of said groove, said spring yielding to permit the tine to tilt in said groove in case the tine encounters an obstruction in the movement of the assembly.

3. A tine assembly for raking implements comprising, in combination, a tine supporting bar apertured to present a hole for the tine, means on said bar defining an annular groove concentric with said hole, a tine having an elongated crop engaging portion with an annular abutment at one end engageable with the bottom of said groove, and spring means connected to said bar and said tine operative to apply tension to the tine to yieldably maintain it substantially normal to said bar with said abutment in full engagement with the bottom of said groove.

4. A time assembly for crop handling implements comprising, in combination, an elongated tine supporting bar having a series of holes spaced apart along its length, said bar also having a series of annular grooves each concentric with one of said holes, a series of tines each comprising an elongated crop engaging portion having an integral loop at one end and an integral annular abutment portion adjacent said hook element, said abutment portion engaging in one of said grooves upon insertion of the loop through the associated hole in the bar, and spring means interposed between said bar and the loop of each tine operative to urge the abutment portion of the time against the bottom of the groove, said spring means yielding to permit the tine to rock upon said abutment portion when the crop engaging portion is subjected to a predetermined laterally directed force.

5. A tine assembly for crop handling implements comprising, in combination, an elongated bar having a series of recessed annular grooves with a hole located centrally of each groove, a series of tines each having an elongated crop engaging portion with a loop at one end insertable through the hole associated with one of the grooves, an annular abutment disposed between the crop engaging portion of the tine and said loop adapted to engage in the groove upon insertion of the loop through a hole, and coiled springs having one of their ends anchored to said bar and the other ends connected to the loops of the respective tines operative to yieldably urge the tines in a direction to maintain their annular abutments in full engagement with the bottom of the respective grooves under normal operating conditions.

6. The combination with a raking implement having a rake reel including a series of revoluble rake bars, a tine assembly for each rake bar, said assembly comprising an elongated support bar adapted to be removably secured to one of said rake bars in parallel relation to the axis of the rake bar, said supporting bar having a series of outwardly facing grooves with a hole centered relative to each groove, a series of tines mounted on said support bar so as to project outwardly therefrom, each of said tines including an elongated crop engaging portion with a hook element at one end, an annular abutment rigid with the crop engaging portion of the tine adjacent said hook element, said abutment engaging in a groove when the hook element of the tine is inserted through a hole in the bar, and spring means carried by said supporting bar yieldably urging said tines in a direction to maintain said abutments in engagement with the bottoms of the respective grooves.

7. The combination with a raking implement having a rake reel including a series of elongated rake bars extending longitudinally of the reel and revoluble as a unit, a unitary tine assembly for each rake bar, said assembly comprising an elongated support bar with a plurality of tines yieldably mounted on said support bar to project laterally from the side thereof, bolts extending through and removably securing said support bar to one of the rake bars, and flanges on said support bar projecting laterally in the opposite direction from said tines, said flanges having their ends shaped for engagement with the rake bar to locate the entire support bar in predetermined spaced parallel relation to the rake bar.

References Cited in the file of this patent

UNITED STATES PATENTS

| | | |
|---|---|---|
| 1,222,815 | Straughn | Apr. 17, 1917 |
| 2,482,883 | Thomas | Sept. 27, 1949 |
| 2,514,560 | Scranton | July 11, 1950 |
| 2,603,936 | Keene | July 22, 1952 |

FOREIGN PATENTS

| | | |
|---|---|---|
| 770,725 | Great Britain | Mar. 20, 1957 |
| 776,766 | Great Britain | June 12, 1957 |